United States Patent
Engelen et al.

(10) Patent No.: US 9,955,559 B2
(45) Date of Patent: Apr. 24, 2018

(54) METHODS AND APPARATUS FOR AUTOMATED COMMISSIONING OF CODED LIGHT SOURCES

(71) Applicant: PHILIPS LIGHTING HOLDING B.V., Eindhoven (NL)

(72) Inventors: Dirk Valentinus René Engelen, Heusden-Zolder (BE); Bartel Marinus Van De Sluis, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 51 days.

(21) Appl. No.: 15/021,057

(22) PCT Filed: Sep. 9, 2014

(86) PCT No.: PCT/IB2014/064333
§ 371 (c)(1),
(2) Date: Mar. 10, 2016

(87) PCT Pub. No.: WO2015/036912
PCT Pub. Date: Mar. 19, 2015

(65) Prior Publication Data
US 2016/0227634 A1    Aug. 4, 2016

Related U.S. Application Data

(60) Provisional application No. 61/875,741, filed on Sep. 10, 2013.

(51) Int. Cl.
*H05B 37/02* (2006.01)
*H04B 10/80* (2013.01)
(Continued)

(52) U.S. Cl.
CPC ....... *H05B 37/0272* (2013.01); *G05D 1/0022* (2013.01); *G05D 1/0234* (2013.01);
(Continued)

(58) Field of Classification Search
CPC ........... H05B 37/0272; H05B 37/0245; G05D 1/002; G05D 1/0234; H04B 10/80; H04B 10/116
See application file for complete search history.

(56) References Cited

U.S. PATENT DOCUMENTS 8,175,799 B1    5/2012  Woehler
2005/0213082 A1*  9/2005  DiBernardo ............ G01S 5/163
356/139.03

(Continued)

FOREIGN PATENT DOCUMENTS

JP    2010002225 A    1/2010
WO    2007029186 A2   3/2007
(Continued)

OTHER PUBLICATIONS

Bae, Jungyun, et al., "Use of Coded Infrared Light for Mobile Robot Localization," Journal of Mechanical Science and Technology 22 (2008) (8 Pages).

(Continued)

*Primary Examiner* — Rami Khatib
*Assistant Examiner* — Jeffrey Boomer
(74) *Attorney, Agent, or Firm* — Meenakshy Chakravorty

(57) ABSTRACT

Disclosed are methods and apparatus for commissioning a light source in a lighting system including a plurality of light sources capable of emitting coded light. An autonomous vehicle with one or more light sensors and a location detector navigates throughout the lighting system. The light sensor detects an identifier encoded in a light source and the location detector determines the location of the autonomous vehicle. The location is associated with the encoded identifier, thereby commissioning the light source.

20 Claims, 9 Drawing Sheets

(51) Int. Cl.
G05D 1/02 (2006.01)
G05D 1/00 (2006.01)
H04B 10/116 (2013.01)

(52) U.S. Cl.
CPC ........... H04B 10/116 (2013.01); H04B 10/80 (2013.01); H05B 37/0245 (2013.01)

(56) References Cited

U.S. PATENT DOCUMENTS

| | | | |
|---|---|---|---|
| 2008/0037241 A1 | 2/2008 | Von Der Brelie | |
| 2008/0238771 A1 | 10/2008 | Katayama et al. | |
| 2009/0033757 A1 | 2/2009 | Shimada | |
| 2010/0074622 A1* | 3/2010 | Damink | G01V 8/20 |
| | | | 398/78 |
| 2010/0082193 A1* | 4/2010 | Chiappetta | G05D 1/0225 |
| | | | 701/24 |
| 2010/0219761 A1* | 9/2010 | Damink | H05B 37/0272 |
| | | | 315/152 |
| 2010/0231513 A1* | 9/2010 | Deliwala | G01S 3/783 |
| | | | 345/158 |
| 2010/0231926 A1 | 9/2010 | Manken et al. | |
| 2010/0271476 A1* | 10/2010 | Damink | H05B 37/0272 |
| | | | 348/135 |
| 2010/0271617 A1* | 10/2010 | Damink | G01S 11/12 |
| | | | 356/5.09 |
| 2011/0156925 A1 | 6/2011 | Lee et al. | |
| 2012/0091896 A1* | 4/2012 | Schenk | H05B 37/0245 |
| | | | 315/132 |
| 2013/0297197 A1* | 11/2013 | Zhai | B60W 30/12 |
| | | | 701/408 |
| 2014/0265870 A1* | 9/2014 | Walma | H05B 37/0218 |
| | | | 315/151 |
| 2014/0375982 A1* | 12/2014 | Jovicic | G01B 11/14 |
| | | | 356/72 |
| 2016/0037293 A1* | 2/2016 | Jovicic | H04W 4/02 |
| | | | 398/118 |
| 2016/0299214 A1* | 10/2016 | Engelen | G01S 1/70 |
| 2016/0338173 A1* | 11/2016 | Knaapen | H05B 33/0869 |
| 2016/0381767 A1* | 12/2016 | Tiberi | G06F 3/04817 |
| | | | 715/736 |
| 2017/0123433 A1* | 5/2017 | Chiappetta | G05D 1/0276 |

FOREIGN PATENT DOCUMENTS

| | | |
|---|---|---|
| WO | 2009010926 A2 | 1/2009 |
| WO | 2009016551 A2 | 2/2009 |
| WO | 2011086517 A1 | 7/2011 |
| WO | 2013057626 A2 | 4/2013 |

OTHER PUBLICATIONS

Linnartz, Jean-Paul M. G., et al., "Code Division-Based Sensing of Illumination Contributions in Solid-State Lighting," Proceedings of the International Conference on Communications, Beijing, China, May 2008 (28 Pages).

* cited by examiner

110

METHODS AND APPARATUS FOR AUTOMATED COMMISSIONING OF CODED LIGHT SOURCES

CROSS-REFERENCE TO PRIOR APPLICATIONS

This application is the U.S. National Phase application under 35 U.S.C. § 371 of International Application No. PCT/IB2014/064333, filed on Sep. 9, 2014, which claims the benefit of U.S. Provisional Patent Application No. 61/875,741, filed on Sep. 10, 2013. These applications are hereby incorporated by reference herein.

TECHNICAL FIELD

The present invention relates to commissioning a light source. More particularly, various inventive methods and apparatus disclosed herein relate to use of an autonomous vehicle for commissioning a light source in a lighting system comprising a plurality of light sources capable of emitting coded light.

BACKGROUND

Coded light ("CL") systems generally comprise a plurality of lights within each of which is embedded a unique identifier or code. The invisible identifier or code can be embedded in light sources such as light emitting diodes ("LEDs") as well as incandescent, halogen, fluorescent, and high-intensity discharge lamps. The identifier is based on modulation of visible light of the light source or by placing an additional infrared source in or with the light source and modulating that light emitted by this infrared source. LEDs are particularly well-suited for CL systems since they allow for high modulation bandwidth and frequency.

The unique identifier or code emitted by the light source can be utilized by a wide variety of tools and applications, including the identification of one or more specific light sources in the presence of numerous light sources, which in turn enables applications such as lighting manipulation and modification schemes. Further, information about the spatiotemporal location of the identified light source can either be separately associated with the identified light source's identifier, or can be directly embedded into the code transmitted by the coded light source. Coded light systems can be established in any location where a receiver capable of detecting coded light can be used, including but not limited to shopping malls, homes, office buildings, tunnels, subways, parking garages, and other locations.

When a CL system is constructed each light source within that system, or a subset of light sources within the system, can be assigned a unique identifier or code. Each light source also inherently possesses a unique geographic location simply as a result of its physical introduction to the system. The process of associating a light source's emitted code with the physical location of that light source, and vice versa, is known as "commissioning." Commissioning may be performed, for example, if an intended or possible use of the CL system requires the individual addressability of some or all of the light sources in the system.

However, the commissioning process can be tedious, as a CL system can comprise hundreds or thousands of light sources, each with a unique code and geophysical location. Although there are methods and apparatus for facilitating the commissioning process, these methods and apparatus require continuous input from or participation from a human being. For example, there are portable devices comprising one or more light detectors that are used for commissioning. However, the portable devices must be manually carried, maneuvered, or navigated through the coded lighting system by an individual. There are also motorized commissioning devices with light detectors for commissioning that are similarly driven or navigated through the coded lighting system by the individual. These portable and motorized devices therefore require significant human interaction in order to perform their light commissioning functions.

Thus, there is a need in the art to provide methods and apparatus to enable commissioning without requiring human interaction to maneuver the commissioning device through the coded lighting system, and that optionally overcome one or more drawbacks of existing techniques.

SUMMARY

The present disclosure is directed to commissioning of light sources. More particularly, various inventive methods and apparatus disclosed herein relate to the use of an autonomous vehicle for commissioning a light source in a lighting system comprising a plurality of light sources capable of emitting coded light. In various embodiments, an autonomous vehicle with one or more light receivers navigates throughout the lighting system. The light receivers detect an identifier encoded in a light source, and associate the identifier—and thus the light source—with the location of the vehicle. For example, in some embodiments, the location of each identified light source can be stored in memory, transmitted to the light source to be encoded, or sent to a central repository or controller. Various embodiments of the disclosure include an autonomous vehicle with a processor coupled to a light detector and a location detector. The processor can determine the identifier emitted by a light source and can associate that identified light source with the location of the autonomous vehicle.

Various embodiments of the invention contemplate an autonomous vehicle with a transmitter that is coupled to a processor. For example, the transmitter can transmit information about an identified light source and its associated location information to a receiver. According to some embodiments, the receiver can for example be associated with the identified light source or a lighting system controller that is remote from the transmitter.

Generally, in one aspect, an autonomous light commissioning vehicle is provided and includes: a light detector; a location detector configured to determine the location of the autonomous vehicle; and a processor coupled to the light detector and the location detector. The processor is configured to determine an identifier of the light source detected by the light detector thereby identifying the light source, and to associate the determined location with the identified light source.

In some embodiments, the autonomous light commissioning vehicle also includes a transmitter configured to transmit information regarding an association between the determined location and an identified light source. The transmitter can transmit the association information to the identified light source itself, or a lighting system controller that is remote from the transmitter. The transmitted information can also include a command instructing the identified light source to emit coded light comprising information about the determined location.

In some embodiments, the location detector can include an accelerometer, a global positioning system receiver, or other means for detecting location of the autonomous vehicle.

In some embodiments, the autonomous vehicle can further include a plurality of light sensors at least one of which is capable of detecting the angle of the incoming light. Information about the angle of the light is then used to provide a more exact association between the light effects of a light source and the location of those light effects.

Generally, in another aspect, a system for commissioning a light source in a coded lighting system is provided and includes: a plurality of light sources capable of emitting coded light; and an autonomous vehicle comprising a processor coupled to a light detector, and a location detector. The processor is configured to determine an identifier of a light source detected by the light detector thereby identifying the light source, and is further configured to determine the location of the autonomous vehicle and associate the determined location with the identified light source.

In some embodiments of the system, the autonomous vehicle includes a transmitter which can be coupled to the processor. The transmitter can transmit the association information to the identified light source itself, or a lighting system controller that is remote from the transmitter. The transmitted information can also include a command instructing the identified light source to emit coded light comprising information about the determined location.

Generally, in another aspect, a method of commissioning a light source in a coded lighting system is provided and includes the steps of: providing an autonomous vehicle comprising a light detector, a location detector, and a transmitter, and configured to autonomously move within the coded lighting system; detecting, by the light detector, coded light emitted from a light source, thereby identifying the light source; detecting, by the location detector, the location of the autonomous vehicle; associating the detected location of the autonomous vehicle with the identified light source; and transmitting, by the transmitter, information regarding the association between the determined location and the identified light source. After transmitting the information, the autonomous vehicle moves to another location within the coded lighting system.

In some embodiments, the transmitter is configured to wirelessly transmit a command to the identified light source instructing the light source to emit coded light that comprises information about the determined location.

In some embodiments, the method further includes the steps of: detecting, by the light detector, the angle of the coded light emitted from the light source. The detected angle of the coded light can be utilized to associate multiple locations with the identified light source. For example, a single light source may have multiple light effects in various locations proximate to that light source. Information about the angle of the coded light can be utilized to form more accurate associations between the specific light effects and the location of those light effects.

In some embodiments, the method includes providing an autonomous vehicle comprising a camera or other environment detection tool. For example, the method can further comprise the step of visualizing, utilizing the camera, one or more areas within the coded lighting system. In some embodiments, the autonomous vehicle utilizes the detection tool output, such as an image, to inform the vehicle about its environment and therefore facilitate its movement throughout that environment.

Other embodiments may include a non-transitory computer readable storage medium storing instructions executable by a processor to perform a method such as one or more of the methods described herein. Yet other embodiments may include memory and one or more processors operable to execute instructions, stored in the memory, to perform a method such as one or more of the methods described herein.

As used herein for purposes of the present disclosure, the term "LED" should be understood to include any electroluminescent diode or other type of carrier injection/junction-based system that is capable of generating radiation in response to an electric signal and/or acting as a photodiode. Thus, the term LED includes, but is not limited to, various semiconductor-based structures that emit light in response to current, light emitting polymers, organic light emitting diodes (OLEDs), electroluminescent strips, and the like.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

As used herein for purposes of the present disclosure, the term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, etc.

A light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In a lighting system comprising a plurality of light sources capable of emitting coded light, it may be desirable to associate a unique identifier emitted by a light source and the location of the light effect of the light source. For example, this commissioning may be performed if an intended or possible use of the CL system requires the individual addressability or location of some or all of the light sources in the system. The commissioning process can be tedious since a lighting system can comprise hundreds or thousands of light sources each with a unique code and geophysical location. Accordingly, it may be desirable to automate commissioning of the light sources within the lighting system.

To automate commissioning, some lighting systems utilize portable devices with one or more light detectors that are used for commissioning. To automate commissioning, some other lighting systems utilize motorized commissioning devices with light detectors. Such devices may present one or more drawbacks.

Thus, Applicants have recognized and appreciated a need in the art to provide methods and apparatus that enable commissioning without requiring human interaction to maneuver the commissioning device through the coded lighting system, and that optionally overcome one or more drawbacks of existing techniques.

In view of the foregoing, various embodiments and implementations of the present invention are directed to intelligent lighting control.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. Implementation of the one or more aspects described herein in alternatively configured environments is contemplated without deviating from the scope or spirit of the claimed invention.

Figure 1:
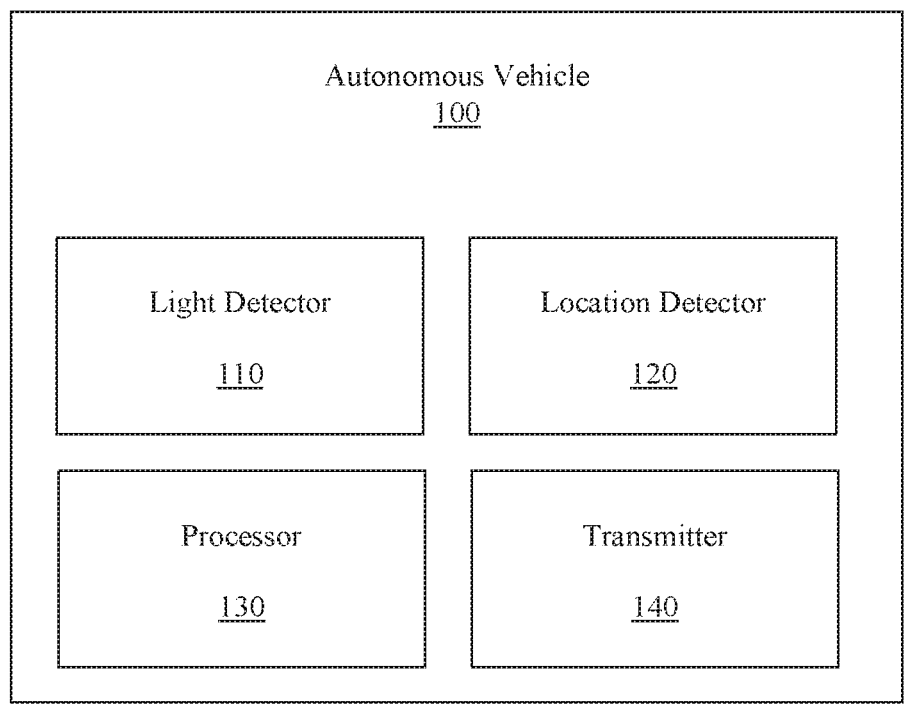
FIG. 1 illustrates a block diagram of an embodiment of an autonomous commissioning vehicle.

FIG. 1 illustrates a block diagram of an embodiment of an autonomous vehicle 100 having a light detector 110, a location detector 120, a processor 130, and a transmitter 140. In various embodiments, autonomous vehicle 100 comprises a mobile structure with a chassis that holds, carries, or otherwise supports the light detector 110, location detector 120, processor 130, and transmitter 140. The mobile structure may be any structure capable of autonomous mobility, including a structure comprising tires, skids, skates, skis, rollers, propellers, or any other components that can be actuated for movement. In some embodiments, the vehicle is instructed by a remote control to move through the environment containing the light sources to be commissioned.

In some embodiments, autonomous vehicle 100 is utilized in a lighting system comprising at least one light source. The lighting system can be one or more light sources in a room such as an apartment room or an office room, a room in a public place, or a part of an outdoor environment, such as a street. In other embodiments, the lighting system can be one or more light sources in a larger space such as an amphitheater, stadium, tunnel, parking garage, shopping mall, warehouse, or any other space with one or more light sources.

In some embodiments, one or more of the light sources in the lighting system is capable of emitting coded light. For example, this emitted light can comprise a modulated portion or part associated with a light source identifier. The emitted light may also comprise an un-modulated portion or part associated with an illumination contribution. Optionally, one or more of the light sources may be associated with a number of lighting settings, including settings that pertain to the illumination contribution of the light source such as color, color temperature, dimming level, and intensity of the emitted light.

Figure 2:
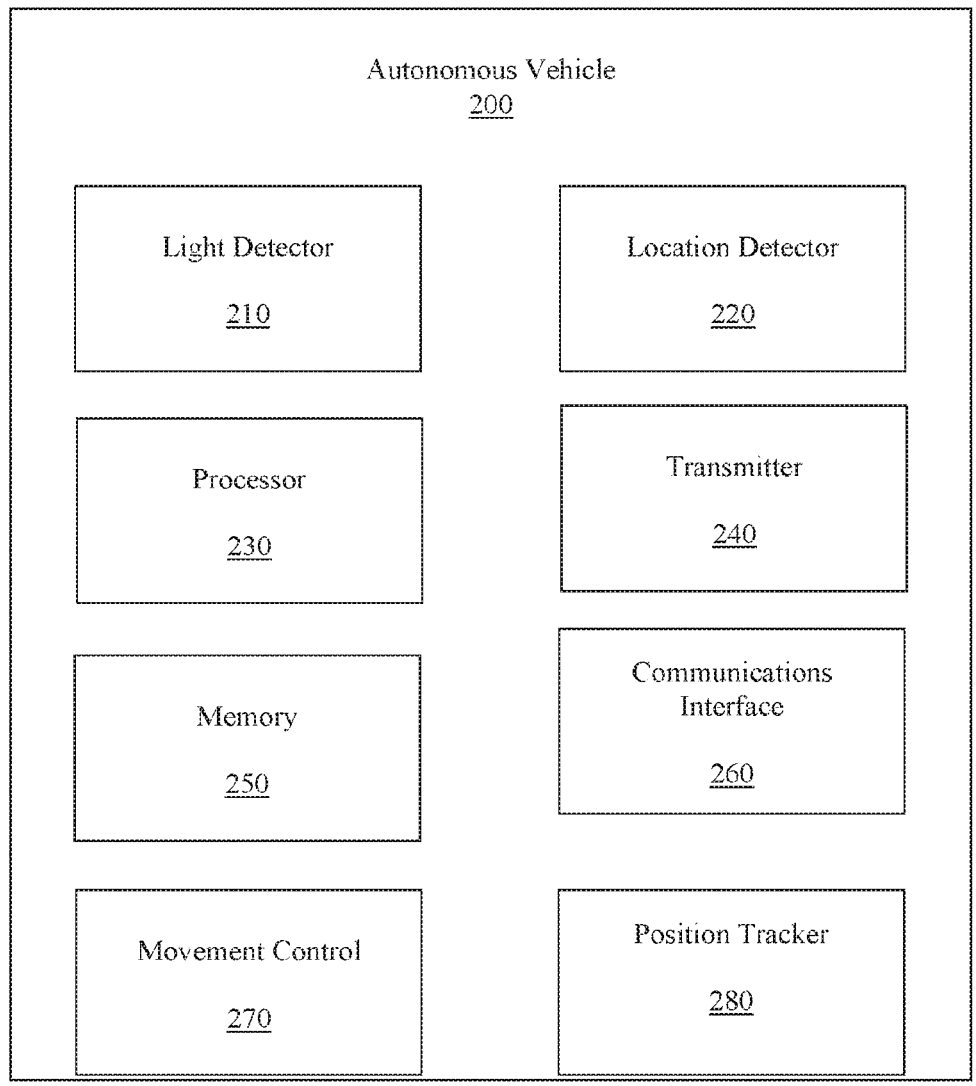
FIG. 2 illustrates a block diagram of an embodiment of an autonomous commissioning vehicle.

In some embodiments, including the embodiment illustrated in FIG. 2, autonomous vehicle 200 comprises a movement control and actuation component 270 that uses commands from a processor to control the autonomous movement of the vehicle through the environment containing the light sources to be commissioned. The movement control and actuation component can be, for example, any processor or controller that monitors movement of the vehicle and issues commands to the vehicle's mobile structure when movement is necessary or desired. For example, in some embodiments, movement control and actuation component 270 comprises a controller or processor that regulates one or more motors which enable rotation of one or more tires, or control of the propellers. The movement control and actuation component 270 may be the same component as processor 230, can be in communication with processor 230, or may be a separate component.

In some embodiments, autonomous vehicle 200 includes a position tracker 280 that enables the vehicle to monitor or retrieve its location within the lighting system environment and enable movement of the vehicle within that system. For example, position tracker 280 can be one or more cameras external to or embedded within the vehicle that characterizes or maps the geometry of the environment through which the vehicle is traveling. According to embodiments, information from position tracker 280 (such as images taken by a camera) is mapped onto a pre-programmed or pre-determined map of the lighting system environment in order to determine or track the exact location of the autonomous vehicle 200 within the system. In some embodiments, position tracker 280 can be one or more sensors configured to detect various aspects of the environment. For example, the one or more sensors may include various types of sensors, including but not limited to one or more proximity sensors, one or more gyroscopes to detect orientation, one or more presence sensors, one or more motion sensors (e.g., accelerometers), or one or more capacitive touch sensors. In various embodiments, two or more different types of sensors are used to triangulate data sets to provide improved location detection accuracy.

In some embodiments, information obtained or retrieved by position tracker 280 is utilized by movement control and actuation component 270 to navigate through the environment. For example, information about obstacles in the path of the autonomous vehicle may be used by movement control and actuation component 270 to determine a course of action such as altering the course of the vehicle or coming to a complete stop. In such an embodiment, the information obtained by position tracker 280 can be transferred directly to movement control and actuation component 270 where it is analyzed. Alternatively, the information obtained by position tracker 280 can be stored in memory and retrieved for later use. As yet another alternative, the information obtained by position tracker 280 can be analyzed by processor 280 prior to be utilized by movement control and actuation component 270.

In some embodiments, the lighting system may be deployed in a parking garage, shopping mall, or other structure that has multiple levels. Position tracker 280 can utilize information about the altitude or floor level of the environment when calculating or tracking its location. The information about altitude or floor level of the environment can be entered manually or can be detected automatically by an altimeter or by detection of RF beacons installed on each floor.

In some embodiments, the autonomous vehicle is configured to detect light at multiple altitudes. For example, the autonomous vehicle may include machinery allowing the vehicle to hover, fly, or float to other levels, heights, or altitudes within the lighting system. In some embodiments, the light detector of the autonomous vehicle is deployed on an arm or other extendable component that allows the light detector to be raised and lowered to different altitudes without moving the vehicle.

Light detector 110 may be one or more light sensors, such as light emitting diodes, that are mounted in or on, or carried by, autonomous vehicle 100. For example, there may be multiple sensors which can be mounted at different locations on autonomous vehicle 100, including in a particular pattern to maximize detection and analysis of incoming light. In some embodiments light detector 110 extends outwardly from autonomous vehicle 100. For example, light detector 110 may be an organized array of light sensors on or in a ball or other geometric structure that is mounted to or extending from autonomous vehicle 100. In an embodiment, an array of light sensors mounted on a ball can receive light simultaneously from multiple different directions and angles, thereby simultaneously receiving light from several different light sources. In some embodiments, light detector 110 comprises one or more CCD cameras oriented to detect emitted light. According to embodiments, light detector 110 comprises optics to narrow the detection beam of the sensors.

In some embodiments, light detector 110 is configured to measure the intensity of the light and send the data to a pulse width modulation ("PWM") decoder which translates the intensity values into a data stream. The PWM decoder can use the data to retrieve the unique identifier emitted by the light source. In some embodiments, autonomous vehicle 100 may be programmed or directed to detect the strongest possible effect of a light source by repositioning itself within the light effect radius.

In some embodiments, the unique identifier emitted by the light source is pre-programmed or otherwise already entered into a database of identifiers. The obtained identifier can then be compared to the database of identifiers to search for a match. A match can be used to determine, verify, or correct a pre-programmed location for that light source. For example, according to some embodiments, a unique identifier is associated with a specific location and that information is stored in a database. During commissioning using the autonomous vehicle, location information can be retrieved from the database once the vehicle has determined an identifier using light detector 110. In some embodiments, that retrieved location information can be compared to the location information independently determined by autonomous vehicle 100. The results of the comparison can be utilized to confirm or correct the previously-stored location information associated with that unique identifier.

Figure 6:
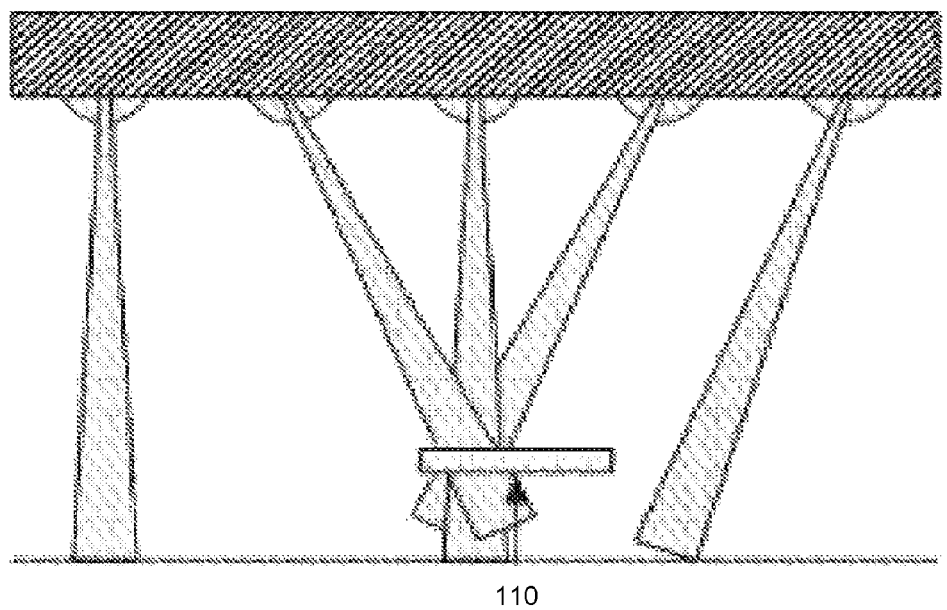
FIG. 6 illustrates example components of a lighting system.
Figure 7A:
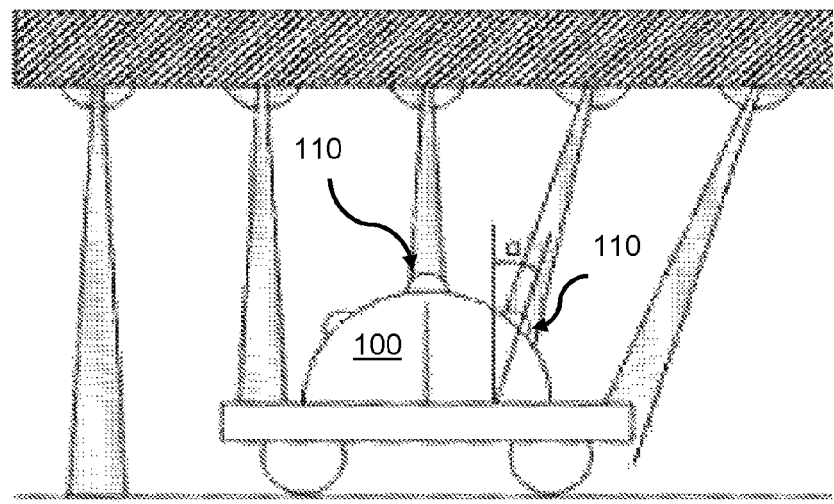
FIGS. 7A and 7B illustrate example components of a coded light commissioning system using an autonomous vehicle.
Figure 7B:
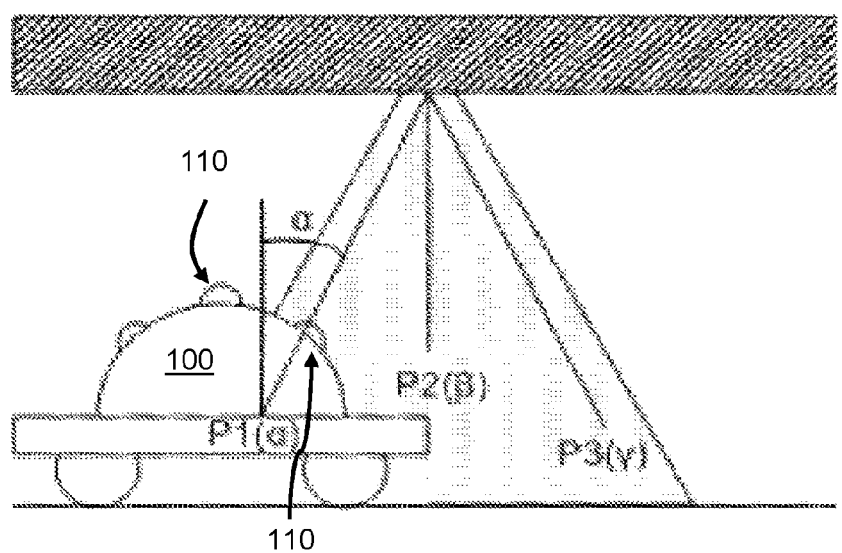

In other embodiments, light detector 110 may simultaneously detect coded light from two or more light sources, as illustrated by FIG. 6. Since a light source may emit light at a variety of angles and intensities, a single light source can have a "light effect" footprint which is much larger than the light source itself. For example, although a light source may have a radius equal to X, the light effects of that light source may cover an area with a radius much larger than X. In some embodiments, the vehicle may reposition itself to find a location where only one of the light effects is dominant. Alternatively, the codes emitted by the two or more light sources can be made independent such that they are distinguishable. In some embodiments, light detector 110 is configured to detect the angle of the incident light, as illustrated by FIGS. 7A and 7B. In these figures, light detector 110 comprises two or more sensors, one of which detect a light beam perpendicular to the base of the vehicle, and another of which detects a second light beam at an angle of $\alpha$ degrees to the vehicle. In some embodiments, this angle information is utilized to distinguish different positions in a single beam. Together with the orientation of the vehicle, the beam angle information divides the wide beam in different zones with different positions. In some embodiments, a light detecting device reconstructs the beam and orientation information in order to select the matching beam and thus derive the correct position in the wide beam. In some embodiments, autonomous vehicle 100 uses this angle information to associate multiple locations to a single light source by associating location information with multiple light effects of that single light source.

Location detector 120 may be based on a global positioning system, or on a local positioning system. In some embodiments, location detector 120 is based on a global positioning system. In these embodiments, autonomous vehicle 100 is equipped with a GPS signal receiver that receives GPS signals from two or more transmitters and calculates the position of the vehicle. However, GPS signals cannot be received in some places where a commissioning system is deployed, including in shopping malls, tunnels, and parking garages. According to other embodiments, location detector 120 is based on movement tracked from an initial known position. In these embodiments, the vehicle begins at an exact, known location. When the vehicle moves from that location, the coordinates of movement (such as x, y, and z) are tracked. Further, wheel rotations can be utilized to track the distance traveled by the vehicle. This tracked location information can be utilized by the vehicle to continually be aware of where it is within a pre-programmed space without external location input.

In some embodiments, the lighting system can comprise radio or acoustic beacons to provide positioning information. In these embodiments, location detector 120 comprises radio or acoustic receivers configured to receive signals from the radio or acoustic beacons within the system. By measuring the distance of the vehicle to the different beacons, the position can be calculated. In some embodiments, these beacons are temporary for the purposes of commissioning.

In some embodiments, location detector 120 can be one or more cameras external to or embedded within the vehicle that characterizes or maps the geometry of the environment through which the vehicle is traveling. Information from location detector 120 (such as images taken by a camera) is mapped onto a pre-programmed or pre-determined three-dimensional visual model of the lighting system environment in order to determine or track the exact location of the autonomous vehicle 100 within the system. In some embodiments, location detector 120 can be one or more sensors configured to detect various aspects of the environment. For example, the one or more sensors may include various types of sensors, including but not limited to one or more proximity sensors, one or more gyroscopes to detect orientation, one or more presence sensors, one or more motion sensors (e.g., accelerometers), or one or more capacitive touch sensors. In various embodiments, two or more different types of sensors are used to triangulate data sets to provide improved location detection accuracy.

Processor 130 or 230 may be any processor, controller, or computer. In some embodiments, the processor is in wired or wireless communication with the light detector, the location detector, and the transmitter. The processor may employ one or more microprocessors programmed using software to perform one or more of the various functions discussed herein. In some embodiments, processor 230 is associated with memory 250. In some implementations, the storage media may be encoded with one or more programs that, when executed on one or more processors and/or controllers, perform at least some of the functions discussed herein. In some embodiments, all detected light source identifiers are stored in memory 250. In some embodiments, all detected location information is stored in memory 250. Storing light source identifiers and/or location information allows the vehicle to determine whether an identifier and/or location has previously been recorded or attained by the system. In some embodiments, rather than transmitting information about the association between location and identifiers, memory 250 stores all obtained information for download.

In some embodiments, processor 130 determines or retrieves identifier information about a light source, and associates that identifier with location information determined or obtained by the location detector 120. For example, the association can be a linker or other reference in memory of a detected identifier with a determined location. In some embodiments, processor 130 instructs transmitter 140 to transmit the association information to an external receiver, as detailed below. For example, processor 130 may package the association information into a format suitable for transmission. In some embodiments, processor 130 instructs transmitter 140 to transmit only location information when a unique identifier is received.

Transmitter 140 is a wired or wireless transceiver or transmitter configured to transmit data. In some embodiments, transmitter 140 is in wired or wireless communication with processor 130 and receives commands from processor 130 regarding transmission. Transmitter 140 may also receive the data to be transmitted from processor 130. In some embodiments, the information transmitted by transmitter 140 comprises the determined location of the vehicle. In other embodiments, the information transmitted by transmitter 140 comprises information about both the detected identifier of a light source and the determined location of the vehicle.

In some embodiments, the information transmitted by transmitter 140 is received by the light source for which the autonomous vehicle has detected the identifier. In these embodiments, the light source comprises one or more transceivers (or coded light receiver) configured to receive location information transmitted by transmitter 140. The transmitter can continuously transmit location information, or can transmit location information when it detects a coded identifier. The location information received by the light source can then be encoded within that light source and will be transmitted to any coded light receiver within the range of that emitted light.

Figure 3:
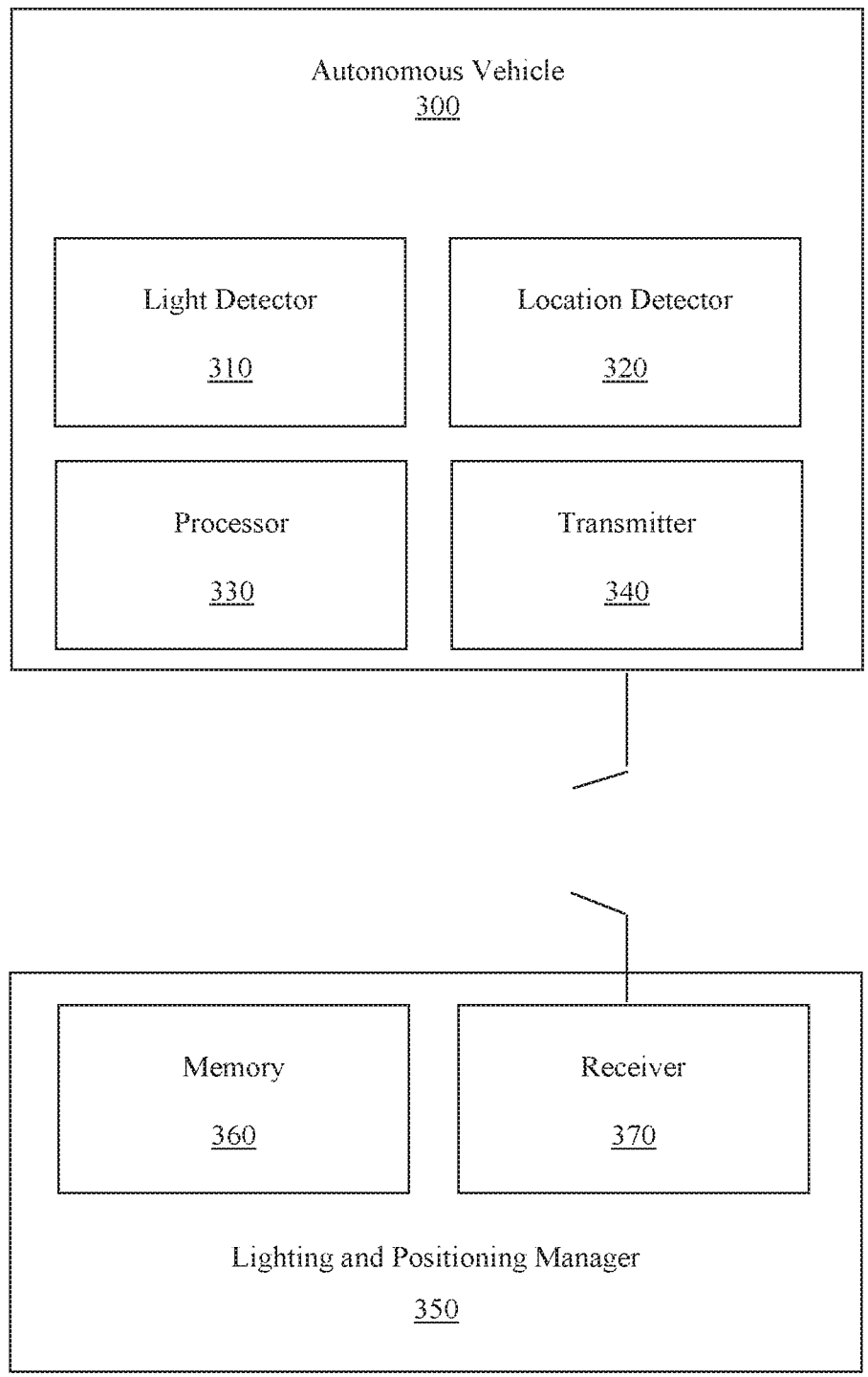
FIG. 3 illustrates a block diagram of an embodiment of a commissioning system with an autonomous vehicle.

In some embodiments, including the embodiment illustrated in FIG. 3, the information transmitted by transmitter 340 is received by the wireless receiver 370 of a lighting and positioning manager 350. The lighting and positioning manager 350 can be configured to manage information about the association of a unique identifier of a light source within the lighting system and the location of a light effect of that light source. In some embodiments, lighting and positioning manager 350 comprises memory 360 configured to store information received from autonomous vehicle 300 via transmitter 340.

In some embodiments, lighting and positioning manager 350 is configured to transmit the stored commissioning information to users of the coded lighting system. The information transmitted to the user's device can comprise the list of unique identifiers. When the user's device is held in the coded light beam and determines the identifier, it can then contact the lighting and positioning manager to retrieve the position information. In some embodiments, the information transmitted to the user's device can comprise information about locations associated with one or more identifiers as determined by the autonomous commissioning service.

In some embodiments, lighting and positioning manager 350 is in wired communication with the plurality of light sources within the lighting system, and is configured to transmit the stored commissioning information to a specific light source within that system. For example, if autonomous vehicle 100 detects identifier X, associates that identifier with a specific location, and transmits the association information to lighting and positioning manager 350, the lighting and positioning manager can then send that information to the light source associated with identifier X for storage and/or transmission within its coded light.

Figure 4:
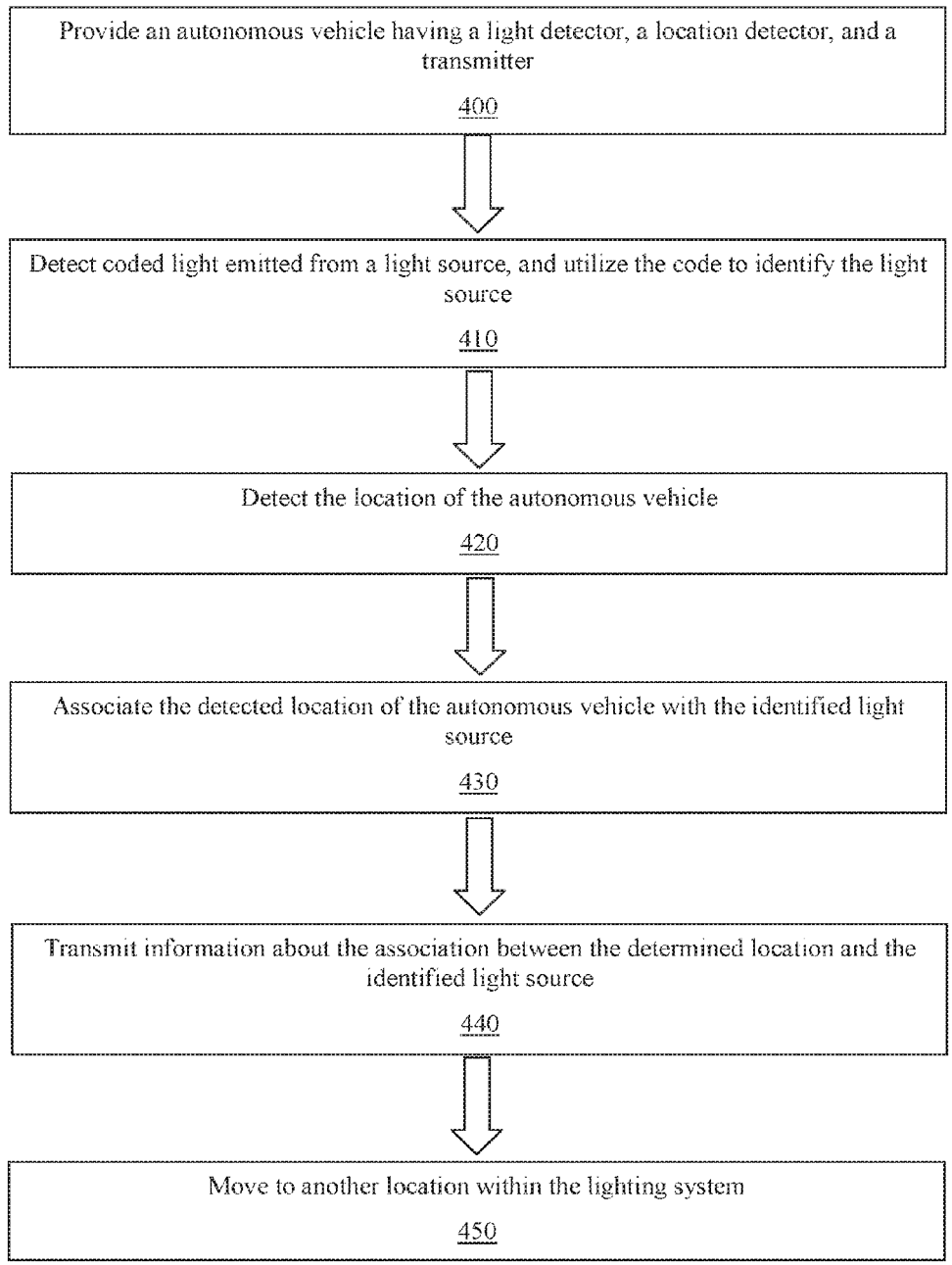
FIG. 4 illustrates a flow chart of an example method of commissioning light sources within a lighting system utilizing an autonomous vehicle.

Referring to FIG. 4, a flow chart of an embodiment of commissioning a plurality of light sources within a lighting system utilizing an autonomous vehicle is provided. Other implementations may perform the steps in a different order, omit certain steps, and/or perform different and/or additional steps than those illustrated in FIG. 4. For convenience, aspects of FIG. 4 will be described with reference to one or more components of an LED-based lighting unit that may perform the method. The components may include, for example, the autonomous vehicle of FIG. 1. Accordingly, for convenience, aspects of FIG. 1 will be described in conjunction with FIG. 4. It is noted that the flow chart of FIG. 5 provides an example version of the embodiment of the flow chart of FIG. 4.

At step 400 an autonomous vehicle having a light detector, a location detector, and a transmitter is provided. For example, the autonomous vehicle may be autonomous vehicle 100 or 200. In various embodiments, the autonomous vehicle comprises a mobile structure with a chassis that holds, carries, or otherwise supports light detector 110, location detector 120, processor 130, and transmitter 140. The mobile structure may be any structure capable of autonomous mobility, or may be instructed by a remote control to move through the environment containing the light sources to be commissioned.

At step 410 coded light emitted from a light source is detected by light detector 110 of autonomous vehicle 100 and is analyzed to determine the identifier encoded within that coded light. The coded light may be detected by one or more light sensors of light detector 110. For example, there may be multiple sensors which can be mounted at different locations on autonomous vehicle 100, including in a particular pattern to maximize detection and analysis of incoming light. In some embodiments, the coded light is analyzed by a PWM demodulator to determine or otherwise characterize the identifier encoded within the light emitted by a light source. In some embodiments, the unique identifier emitted by the light source is pre-programmed or otherwise already entered into a database of identifiers. In various embodiments, light detector 110 may simultaneously detect coded light from two or more light sources.

Figure 5:
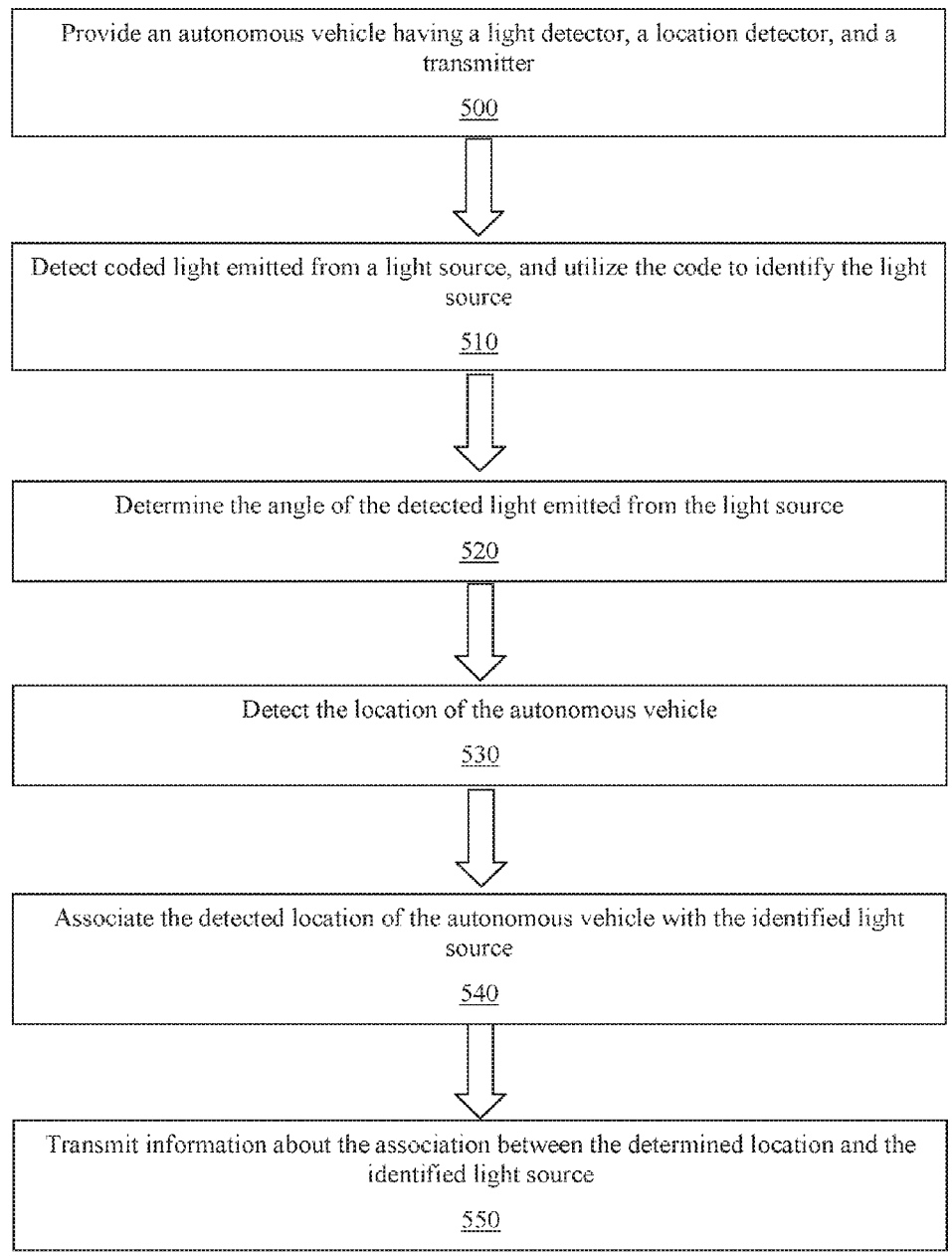
FIG. 5 illustrates a flow chart of an example method of commissioning light sources within a lighting system utilizing an autonomous vehicle.

In some embodiments the angle of the coded light emitted from a light source is detected by the light detector, as illustrated in step 520 of FIG. 5. In some embodiments, this angle information is utilized to distinguish different positions in a single beam. Together with the orientation of the vehicle, the beam angle information divides the wide beam in different zones with different positions. In some embodiments, a light detecting device reconstructs the beam and orientation information in order to select the matching beam and thus derive the correct position in the wide beam. In some embodiments, autonomous vehicle 100 uses this angle information to associate multiple locations to a single light source by associating location information with multiple light effects of that single light source.

At step 420 the location of the autonomous vehicle is determined, for example by location detector 120 of the autonomous vehicle. In some embodiments, the location is determined through use of a global positioning system or on a local positioning system. In some embodiments, autonomous vehicle 100 is equipped with a GPS signal receiver that receives GPS signals from two or more transmitters and calculates the position of the vehicle. According to other embodiments, location detector 120 is based on movement tracked from an initial known position. This tracked location information can be utilized by the vehicle to continually be aware of where it is within a pre-programmed space without external location input. In these embodiments, location detector 120 comprises radio or acoustic receivers configured to receive signals from radio or acoustic beacons within the system. In some embodiments, location detector 120 can be one or more cameras external to or embedded within the vehicle that characterizes or maps the geometry of the environment through which the vehicle is traveling. Information from location detector 120 (such as images taken by a camera) is mapped onto a pre-programmed or pre-determined three-dimensional visual model of the lighting system environment in order to determine or track the exact location of the autonomous vehicle 100 within the system.

At step 430 the detection location of the autonomous vehicle is associated with the identifier encoded within the detected light. In some embodiments, processor 130 determines or retrieves identifier information about a light source and associates that identifier with location information determined or obtained by the location detector 120. For example, the association can be a linker or other reference in memory of a detected identifier with a determined location.

At step 440, information about the location of the autonomous vehicle is transmitted. In some embodiments, the autonomous vehicle comprises a transmitter 140 to transmit the association information to an external receiver. In some embodiments the information transmitted by transmitter 140 comprises the determined location of the vehicle. In other embodiments, the information transmitted by transmitter 140 comprises information about both the detected identifier of a light source and the determined location of the vehicle. In some embodiments, the information transmitted by transmitter 140 is received by the light source for which the autonomous vehicle has detected the identifier. In some embodiments the information transmitted by transmitter 140 is received by the wireless receiver of a lighting and positioning manager.

At step 450 the autonomous vehicle 100 moves to another location within the lighting system. In some embodiments, the method begins again at step 400.

Figure 8:
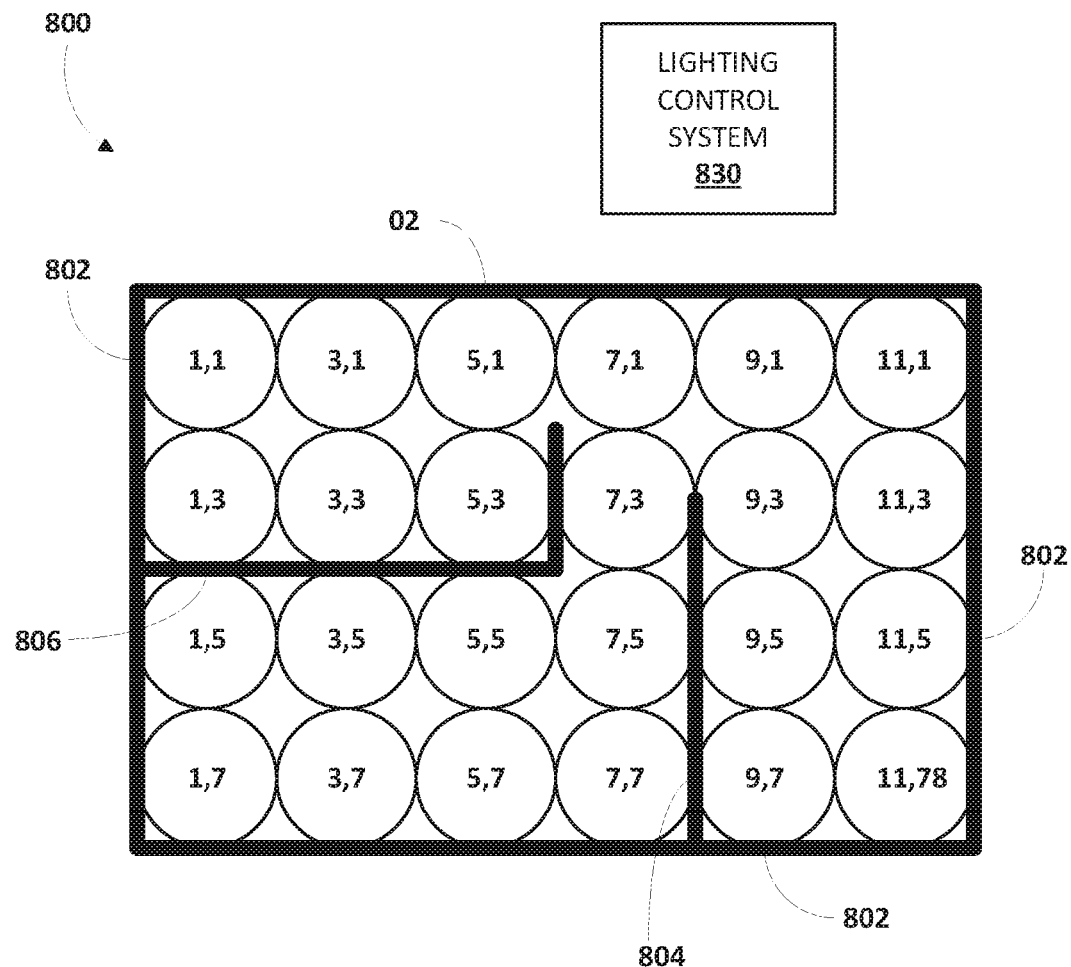
FIG. 8 illustrates a top-down view of an example environment illuminated by a plurality of lighting effects, each corresponding to a node of a graph, in accordance with various embodiments.

Referring to FIG. 8, an example environment 800 is depicted. Environment 800 is defined by four outer walls 802, a first inner wall 804 and a second inner wall 806. This is not meant to be limiting, however. These walls are selected for illustrative purposes, and it should be understood that an environment may have any number and/or configuration of walls and/or other physical objects.

A plurality of lighting effects is represented by circles with Cartesian coordinates. In various embodiments, each lighting effect may be produced by, e.g., light cast down by a ceiling-mounted LED-based lighting unit. However, this is not meant to be limiting, and lighting effects as used herein may be created using light sources mounted elsewhere, such as on the floor, on walls, on top of furniture, and so forth. And while the lighting effects are shown to have uniform sizes, this is not meant to be limiting. Various types of light sources may produce lighting effects of various sizes, and lighting effects may overlap to various extents.

In FIG. 8, the point 0,0 is at the top left of environment 800. However, this is arbitrary and can be set at any point within environment 800 or elsewhere. A first lighting effect is labeled "1,1" because its center corresponds to a point one meter in from the top and left outer walls 802. A second lighting effect is labeled "3,1" because its center corresponds to a point one meter down from top outer wall 802 and three meters in from left outer wall 802. Another lighting effect depicted below the first lighting effect is labeled "1,3" because its center corresponds to a point three meters down from top outer wall 802 and one meter in from left outer wall 802. The remaining lighting effects are labeled in a similar manner.

Also depicted in FIG. 8 is a lighting control system 830, including one or more computing devices operating together to control lighting provided by the plurality of light sources that produce the plurality of the lighting effects. In various embodiments, lighting control system 130 may be configured to communicate with the plurality of light sources in various ways, including but not limited to Wi-Fi, ZigBee, direct network connection, coded light signaling, and so forth. In various embodiments, lighting control system 830 may be configured to cause the light sources that create the lighting effects to emit coded light signals that carry the coordinates of each lighting effect. For example, the light source creating lighting effect 1,1 may emit a coded light signal carrying the Cartesian coordinates "1,1." In other embodiments, the light source may emit a coded light signal carrying other types of location information, such as GPS coordinates, meaningful localization positions (e.g., "northwest corner of third floor," "adjacent clothing rack 1a," "between subway tracks 1 and 2"), and so forth.

These coded light signals may be detected by light sensors (e.g., front-facing or rear-facing cameras) of mobile computing devices such as smart phones and tablet computers. For instance, a user walking through environment 800 may, without even thinking about it, carry her smart phone with a front-facing camera pointed towards the floor. That front-facing camera may detect lighting effects, and coded light signals they carry, that are projected onto the floor from a ceiling-mounted light source such as an LED-based lighting unit. Using that information in combination with a graph that includes nodes that represent lighting effects and edges that represent paths between lighting effects, a mobile device may be able to determine its current position within environment 800.

Assume a user within environment 800 wishes to travel from lighting effect 1,1 to lighting effect 1,5. In various embodiments, possible routes between lighting effect 1,1 and lighting effect 1,5 may be represented by a graph that is provided, e.g., by lighting control system 830, to a mobile computing device operated by the user. The user's mobile computing device may then utilize the graph to instruct the user how to navigate between various points in environment 800.

Figure 9:
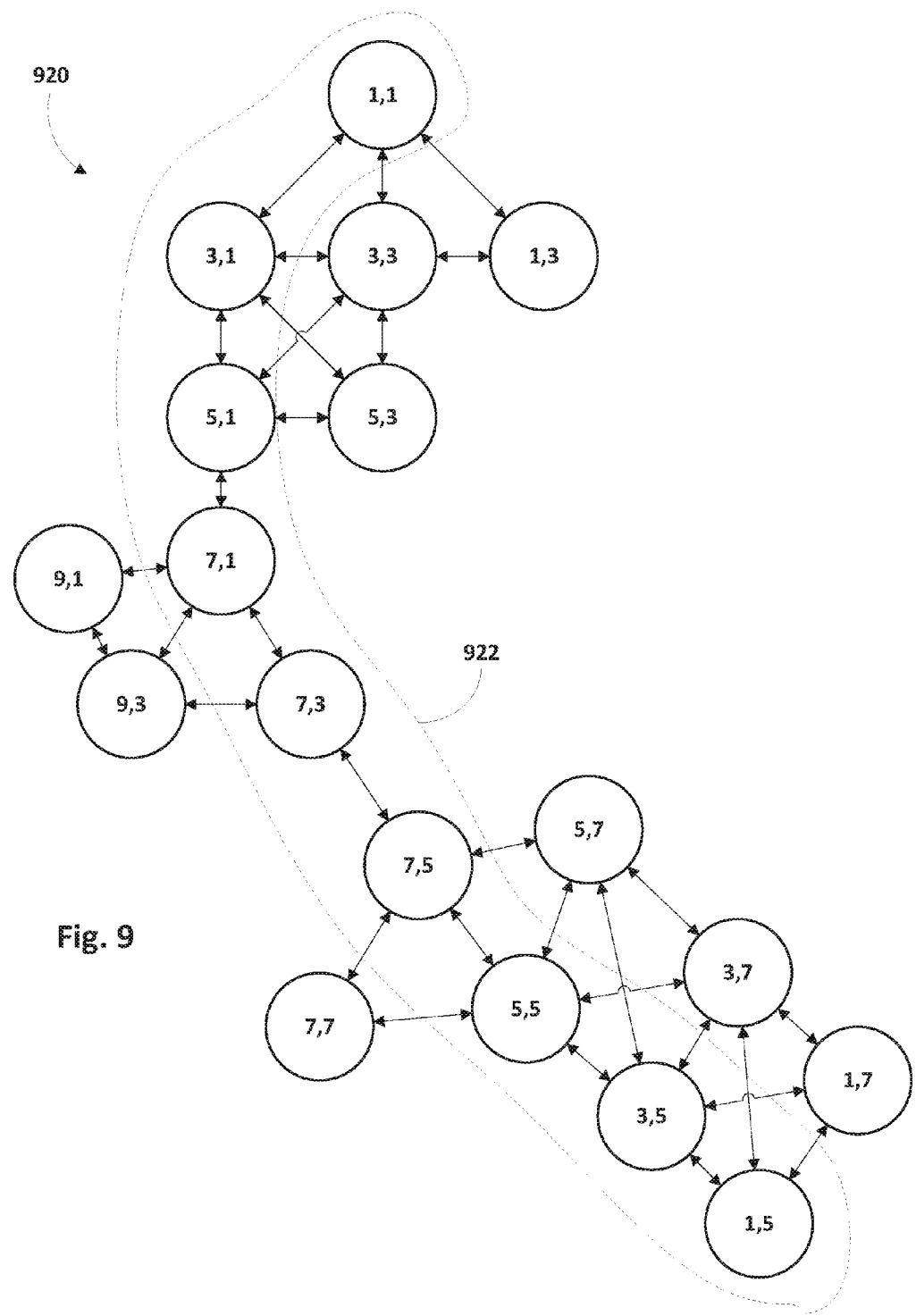
FIG. 9 depicts a portion of an example graph that may be generated showing possible paths through the environment of FIG. 8, in accordance with various embodiments.

FIG. 9 depicts an example graph 920 that includes many, but not all, possible nodes and edges between lighting effects 1,1 and 1,5. Indeed, in various embodiments, graph 820 may be dense, sparse, or anywhere in between. Graph 920 may be various types of graphs, including but not limited to a directed unweighted graph, a directed acrylic graph, a directed weighted graph, and so forth. For example, in various embodiments, each edge may be assigned a numerical weight or distance, which may be used to decide between multiple edges when calculating an optimal path.

An optimal path 922 is enclosed by a dashed line in FIG. 9. This optimal path 922 may have been calculated, e.g., by the user's mobile computing device, with the assumption that each edge is at least approximately equal in weight/distance. It can be seen that while there are a number of possible paths through graph 920 from lighting effect 1,1 to lighting effect 1,5, optimal path 922 may be the quickest. An optimal path between nodes of a graph such as graph 920 may be calculated using various techniques, including but not limited to Dijkstra's algorithm, the Bellman-Ford algorithm, the "A* search" algorithm, the Floyd-Warshall algorithm, Johnson's algorithm, and so forth.

In various embodiments of the invention, while scanning the environment 900, the autonomous vehicle 100 may create the graph 920, identifying nodes and edges of these nodes, accounting for adjacent lighting effects.

For example, an initial version of the graph 922 can be created as follows. In the environment 800, the autonomous vehicle 100 obtains identifiers of the light sources via coded light. Then, starting at any point in the environment, the autonomous vehicle 100 travels through the environment, and, in case a light effect with an unknown identifier is encountered, the information is transmitted to the lighting control system, and a new node in the graph is created and the position of the vehicle is associated to that identifier. An edge is then created from the previous node to the new node, as the vehicle was able to move directly from one node to the other. In case the vehicle detects an overlap of two light effects (the identifiers are retrieved from the coded light), an edge is created between the nodes representing the light effects in the graph.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An autonomous vehicle for commissioning a light source in a coded lighting system comprising a plurality of light sources capable of emitting coded light, comprising:
   a light detector configured to detect the light source of the plurality of light sources, and an angle of detected light from the light source, the angle relative to a vertical plane of the vehicle;
   a location detector configured to determine a location of the autonomous vehicle;
   a processor coupled to the light detector and the location detector, wherein the processor is configured to determine an identifier of the light source detected by the light detector thereby identifying the light source, and further configured to associate the determined location with the identified light source; and a transmitter configured to transmit information regarding the association between the determined location and the identified light source.

2. The autonomous vehicle of claim 1, further comprising:
a movement controller coupled to the processor or another processor and configured to autonomously control the movements of the autonomous vehicle within the coded lighting system.

3. The autonomous vehicle of claim 1, wherein the autonomous vehicle is configured to move to a plurality of different locations within the coded lighting system.

4. The autonomous vehicle of claim 1, wherein the transmitter is configured to wirelessly transmit the information to the identified light source.

5. The autonomous vehicle of claim 1, further comprising:
a storage medium coupled to the processor and configured to store information regarding the association between the determined location and the identified light source.

6. The autonomous vehicle of claim 1, wherein the autonomous vehicle comprises a plurality of light detectors.

7. The autonomous vehicle of claim 1, wherein the light detector is configured to determine the intensity of detected light.

8. The autonomous vehicle of claim 1, wherein the location detector comprises an accelerometer.

9. The autonomous vehicle of claim 1, wherein the processor is further configured to associate a plurality of determined locations with an identified light source, based on the determined angle of the detected light by associating location information with a plurality of light effects of the identified light source.

10. The autonomous vehicle of claim 1, further comprising: a movement controller coupled to the processor or another processor and configured to control movement of the autonomous vehicle within the coded light system.

11. A method for commissioning a light source in a coded lighting system comprising a plurality of light sources capable of emitting coded light, the method comprising the steps of:
providing an autonomous vehicle comprising a light detector, a location detector, and a transmitter, wherein the autonomous vehicle is configured to autonomously move within the coded lighting system;
detecting, by the light detector, coded light emitted from the light source of the plurality of light sources, thereby identifying the light source;
detecting, by the location detector, a first location of the autonomous vehicle;
associating the detected location of the autonomous vehicle with the identified light source; and
transmitting, by the transmitter, information regarding the association between the determined location and the identified light source; and
detecting, by the light detector, an angle of the coded light emitted from the light source, and associating a plurality of locations with the identified light source, wherein the angle is relative to a vertical plane of the vehicle.

12. The method of claim 11, further comprising the step of moving to a second location within the coded lighting system different from the first detected location.

13. The method of claim 11, wherein the transmitter is configured to wirelessly transmit the information to a light system controller.

14. The method of claim 11, wherein the detected angle of the coded light is utilized to associate multiple locations with the identified light source by associating location information with a plurality of light effects of the identified light source.

15. The method of claim 11, wherein the transmitter is configured to wirelessly transmit the information to the identified light source.

16. The method of claim 11, wherein the autonomous vehicle further comprises a camera, and further comprising the step of visualizing, utilizing the camera, an area within the coded lighting system by mapping information from the camera onto a model of an environment surrounding the coded lighting system.

17. The method of claim 11, wherein the autonomous vehicle further comprises a storage medium, and further comprising the step of storing information regarding the association between the determined location and the identified light source.

18. A system for commissioning a light source in a coded lighting system, the commissioning system comprising:
a plurality of light sources capable of emitting coded light, the plurality of light sources including the light source to be commissioned; and
an autonomous vehicle comprising a processor coupled to a light detector configured to detect the light source, and an angle of detected light from the light source, a location detector, and a transmitter, wherein the angle is relative to a vertical plane of the vehicle;
wherein the processor is configured to:
determine an identifier of the light source detected by the light detector thereby identifying the light source, and determine the location of the autonomous vehicle and associate the determined location with the identified light source, and further wherein the transmitter is configured to transmit information regarding the association between the determined location and the identified light source and further wherein the processor is configured to associate a plurality of determined locations with an identified light source by associating location information with a plurality of light effects of the identified light source.

19. The commissioning system of claim 18, wherein the system further comprises a light system controller.

20. The commissioning system of claim 19, wherein the transmitter is configured to wirelessly transmit the information to the light system controller.

* * * * *